Jan. 10, 1939.   J. A. BROWN   2,143,473
MOWING MACHINE
Filed Feb. 11, 1938   3 Sheets-Sheet 3
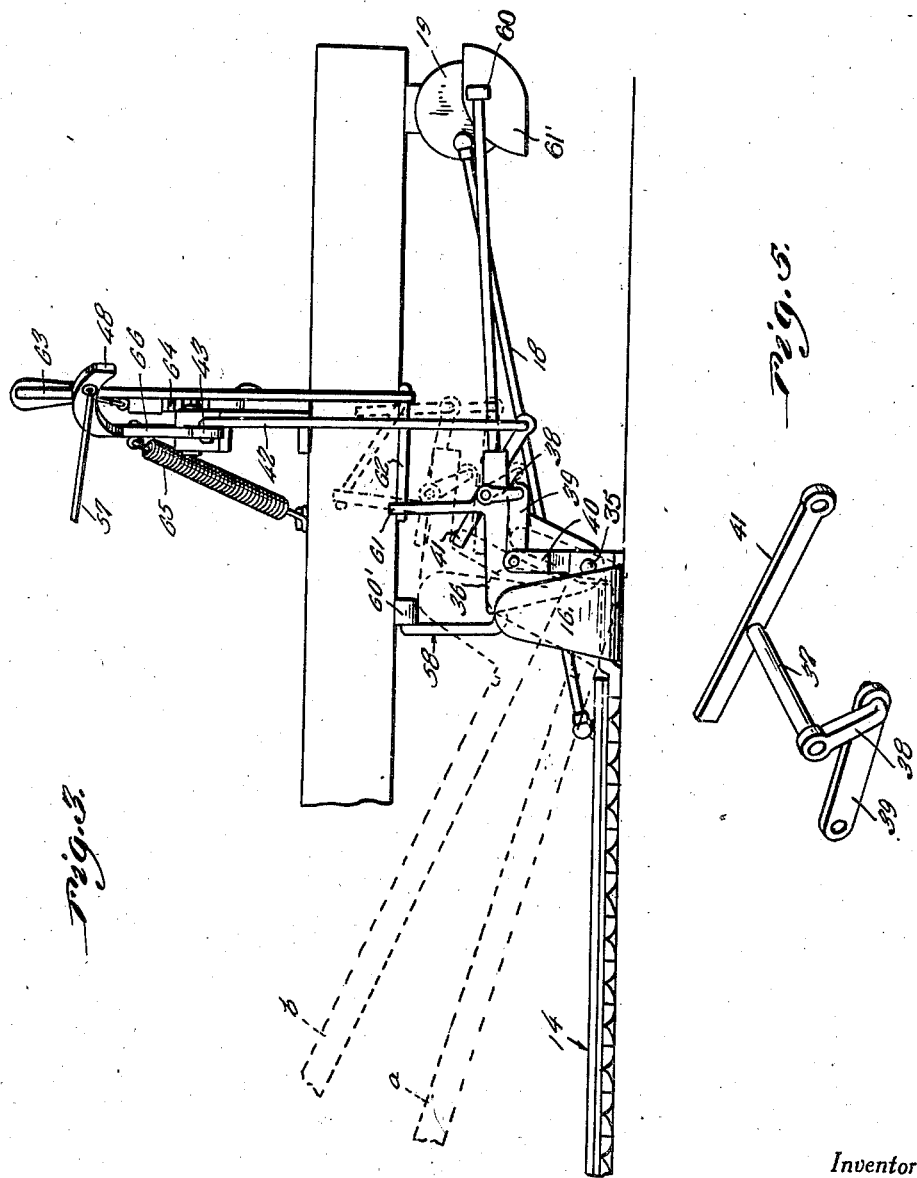
Inventor
J. A. Brown
By Clarence A. O'Brien
Hyman Berman
Attorneys Patented Jan. 10, 1939

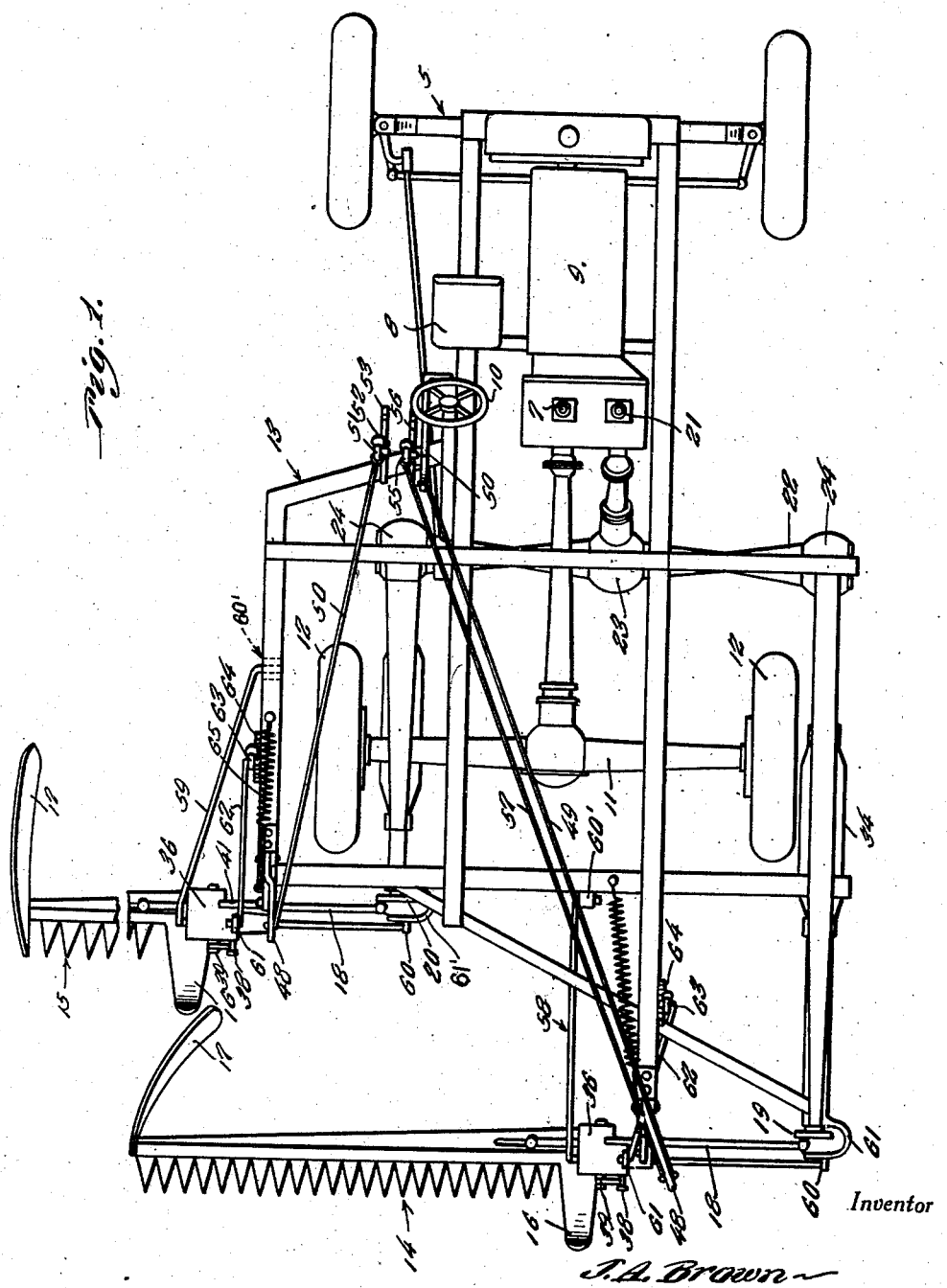

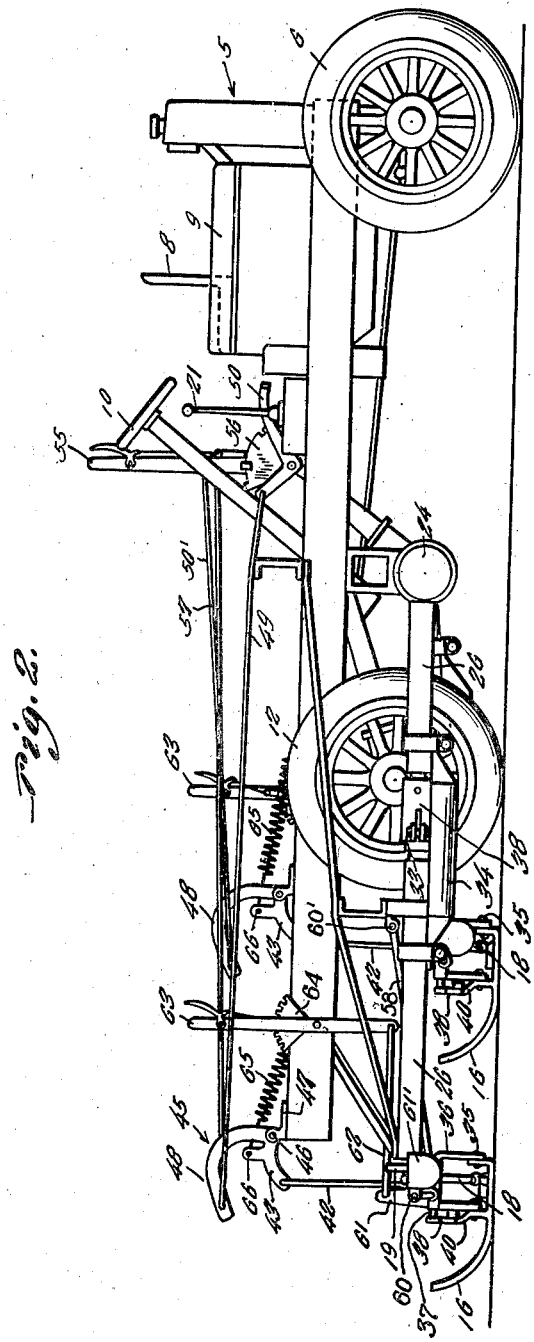
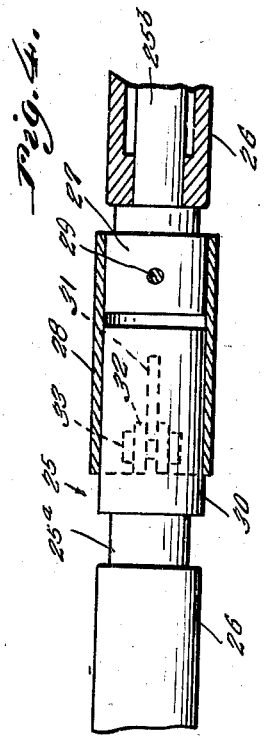

2,143,473

UNITED STATES PATENT OFFICE 2,143,473

MOWING MACHINE

Joseph Ambrose Brown, Armstead, Mont.

Application February 11, 1938, Serial No. 190,073

1 Claim. (Cl. 56—25)

This invention relates to motor-operated mowing machines and an object of the invention is to improve generally upon the types of mowing machines now generally in use and known.

The invention consists in certain novel features of construction, combination and arrangement of elements; and the invention together with its objects and advantages will be best understood from a study of the following description taken in connection with the accompanying drawings wherein:—

Figure 1 is a top plan view of the machine,

Figure 2 is a side elevational view thereof,

Figure 3 is a fragmentary and front elevational view of a cutter assembly,

Figure 4 is a detail view partly in section and partly in elevation showing a slip clutch arrangement hereinafter more fully referred to, and Figure 5 is a perspective view of a shaft and arm arrangement hereinafter more fully referred to.

Referring to the drawings by reference numerals it will be seen that in accordance with the present invention there is utilized a motor vehicle 5 of a standard type arranged so as to normally run backwards instead of forwards. In this connection it will be understood that the engine and the connections between the same and the drive wheels are of conventional standard character so that it is unnecessary to definitely describe and illustrate the same here other than to further state that the axle housing and differential are inverted in position so that the forward speed gearing of the transmission may be used when the vehicle is travelling in a direction opposite to the steering wheels 6.

Further in connection with the foregoing it will be understood, and as shown, that the transmission has a control lever 7 which is disposed conveniently to the driver occupying a seat 8 that is disposed laterally of the engine 9 as clearly shown in Figure 1.

Steering is effected by a steering wheel 10 disposed forwardly of the seat 8.

The axle housing of the vehicle is indicated by the reference numeral 11 while the drive wheels are indicated by the reference numeral 12.

Further in accordance with the present invention there is suitably mounted on the vehicle any suitable frame construction indicated generally by the reference numeral 13, and which frame construction is provided for supporting parts of the invention hereinafter more fully referred to. Since the structure of the frame 13 and its manner of mounting on the vehicle is not of the essence of the invention specific detailed construction thereof is deemed unnecessary.

Mounted in connection with the vehicle 5 and the frame 13 are cutters 14 and 15 respectively, and these cutters are of the conventional type, and of the type which embody a fixed knife bar, a reciprocating cutter bar, forwardly extending ground-engaging shoes, 16, and divider fingers, 17, 17.

Also each cutter has the reciprocating cutter bar thereof reciprocated by a pitman 18 in connection with a crank disk, the crank disk of the assembly 14 being indicated by the reference numeral 19, and the crank disk for the assembly 15 being indicated by the reference numeral 20.

As clearly shown in Figure 1 the cutter assembly 14 is disposed forwardly of the machine and forwardly of the assembly 15 which latter extends laterally beyond the assembly 14 so that a very wide swathe may be cut as the machine travels from one end to the other end of the field.

Further in accordance with the present invention the vehicle 5 is equipped with a power take-off device in the nature of a second transmission associated with the original transmission and for which second transmission there is a control lever 21 that is arranged adjacent to the transmission control lever 7 so as also to be conveniently operated by the occupant of the seat 8.

This power take-off device also includes a main drive shaft driven from the supplemental transmission through a differential gearing, there being provided for the drive shaft a housing 22 and for the differential a housing 23, the differential being of the ordinary automobile type and not thought necessary of illustration.

On the ends of the housing 22 are housings 24 in which are gearing, not thought necessary of illustration, for driving shafts 25, the same being carried in casings 26 which are suitably mounted on the frame 13 at opposite sides of the frame of the vehicle 5. One of the shafts 25 drives the crank disk 19 of the cutter assembly 14 while the other of the shafts 25 drives the crank disk 20 of the cutter assembly 15 as will be clear from a study of Figure 1.

As shown in Figure 4 each shaft 25 consists of a pair of sections 25a, 25b. On one end thereof shaft section 25b is provided with an enlarged portion 27 on which is sleeved one end of a clutch sleeve 28 that is secured thereto through the medium of a pin 29. The complemental shaft section 25a is also provided with a diametrically enlarged end portion 30 which may have any suitable friction surface thereon, and on the enlarged end 30 of the shaft 25a is sleeved the other end of the clutch sleeve 28. This last-named end of the clutch sleeve is split on diametrically opposite sides thereof, longitudinally, as at 31 and said sides are provided with lugs 32 above and below the slits 31 to receive bolts 33 through the medium of which said end of the sleeve 28 is contracted about the portion 30 of the shaft section 25a.

From the above it will be seen should an obstruction, as for example a rock, or the like, interfering with the proper operation of a cutter assembly, the reciprocating cutter bar thereof will not be forced to reciprocate due to the fact that the sleeve 28 secured to the shaft section 25b will merely rotate around the portion 30 of the complemental shaft section 25a without transmitting drive to the section 25a. Thus the possibility of the cutter becoming damaged under such circumstances will be practically eliminated, clutch sleeve 28, together with the part 30 of shaft 25a providing as it were a slip clutch between the sections 25a, 25b, of the shaft.

For protecting the parts of the clutch connection between the sections of each shaft 25 there is supported by the sections of the respective housings 26 suitable shields 34 as shown in Figure 2.

Also each of the cutter assemblies 14, 15 has the stationary knife bar thereof, at the end thereof, remote from the divider finger 17 pivoted as at 35 to a substantially inverted U-shaped bracket 36. Suitably journaled in a bearing extending transversely of the top of the bracket 36 is a shaft 37 that on one end thereof is provided with an arm 38 that is connected through the medium of a link 39 to a fixed arm 40 suitably secured to the pivoted end of the fixed knife bar of the cutter assembly. Also, and as clearly shown in Figure 5, on the other end of the shaft 37 is an arm 41 that is connected through the medium of a link 42 to an arm 43 of a lever 45. Lever 45 is pivoted as at 46 to a suitable bracket 47 provided therefor and suitably mounted on the chassis frame of the vehicle.

The lever 45 is also provided with an arm 48.

The arm 48 of the assembly 14 is connected through the medium of a link 49 with a foot pedal 50 pivotally mounted on the vehicle 5 within convenient reach of the foot of the operator occupying the seat 8.

Also, and as clearly shown in Figure 1, the arm 48 of the bracket 45 associated with the assembly 15 is connected through the medium of a link 50' with a hand lever 51 pivotally mounted on the frame 13 and equipped with a detent 52 cooperable with a notched segment 53 fixedly mounted on the frame 13.

From the above it will be seen that when, for example, it is desired to swing the cutter assembly 14 upwardly to the dotted line position indicated by the reference numeral a in Figure 3, the operator presses on the foot pedal 50 thus causing the lever 45 of the assembly 14 to swing vertically in a clockwise direction. Movement of the lever 45 is transmitted through the link 42 and from the shaft 37 to the shaft 37 and to the fixed knife bar of the cutter assembly 14 causing the latter to swing upwardly to the aforementioned dotted line position a shown in Figure 3. The raising of either cutter assembly to this position will be desired when it is necessary for the cutter assembly to clear some obstruction in the path thereof.

Obviously by pressing farther down on the pedal 50 the aforementioned cutter assembly 14 may be swung upwardly, in substantially the same manner, to the dotted line position b also shown in Figure 3. This last-named position will be the position usually occupied by the cutters when they are not to be in use and under such circumstances the pedal 50 would be used, for example, in swinging the cutter assembly 14 to the position, b, only when this position of the cutter assembly 14 is to be temporary.

In connection with the above it will be understood that the cutter assembly 15 may also be swung to positions corresponding to the positions a and b of Figure 3 by proper manipulation of the hand lever 51. Thus the assemblies 14 and 15 are operated independently of one another.

In connection with the above it will also be understood that the cutter assembly 15 is held in the uppermost position, b, of Figure 3 by engaging the detent carried by the lever 51 with the proper notch in the segment 53 for securing the cutter assembly 15 in this position, b, of Figure 3.

However, to secure the cutter assembly 14 in the position, b, of Figure 3, for an extended period of time resort is had to a hand lever 55 also pivotally mounted on the frame 13 within convenient reach of the occupant of the seat 8 and lever 55 is equipped with a suitable detent cooperable with a notched segment 56 fixedly mounted on said frame 13. Hand lever 55 is connected with the arm 48 of the bracket 45 associated with the assembly 14 through the medium of a link 57. (See Figure 1.)

Provision has also been made whereby each cutter assembly 14, 15, may be tilted on a longitudinal axis to the end that the cutter assembly may be positioned at the desired position of adjustment dependent upon whether it be desirable to cut the standing grain, grass, or the like, long or short.

To this end the bracket 36 of each cutter assembly is pivotally mounted on a substantially L-shaped rod, the rod for the bracket 36 associated with the assembly 14 being indicated by the reference numeral 58 while the corresponding rod forming a pivot for the bracket 36 associated with the assembly 15 is indicated by the reference numeral 59.

It will be seen in connection with each of the rods 58, 59 that said rod at one end is pivoted as at 60 to a fixed shield 61' provided for the crank-disk of each assembly, while the other end of each rod is pivoted in any suitable manner and as indicated generally at 60' to a part of the frame 13.

In connection with the adjusting of the cutter assemblies on longitudinal axes it will be seen that each bracket 36 is provided with an upstanding arm 61 that is connected through the medium of a link 62 with a hand lever 63 suitably and pivotally mounted on the frame 13 and equipped with a detent cooperable with a rack segment 64 fixedly mounted on the frame.

Thus, for example, when it is desired to tilt, for example, the cutter bar assembly 14 either upwardly or downwardly the hand lever 63 provided therefor is rocked in the desired direction and through the medium of the detent associated therewith and the associated rack segment 64 said hand lever is secured at the desired position of adjustment with the result that the selected cutter assembly is held at the desired cutting angle.

The levers 45 are normally urged to rotate in a counter-clockwise direction through the medium of suitably anchored springs 65 which are connected at one end to the frame of the vehicle and at a second end are connected to the arms 43 of the brackets 45 as at 66.

From the foregoing description it will be seen that I have provided a mower embodying two cutter assemblies which are operable independently of one another and that for each assembly means has been provided whereby the assembly may be rotated on an axis transverse to the length thereof in order to swing the assembly upwardly either to a temporary raised position as when required to have the assembly clear an obstruction in the path thereof, or to such a raised position to be maintained in said raised position over any extended period of time; and that further means has been provided for each assembly whereby the latter may be tilted to the desired cutting angle and readily secured at the desired angle of adjustment.

It is further thought that a clear understanding of the construction, utility, operation and advantages of a mowing machine embodying the features of the present invention will be had without a more detailed description thereof.

Having thus described the invention what is claimed as new is:—

A mower of the class described comprising a self-propelled vehicle including a chassis, front and rear pairs of wheels, a power plant, means for driving the front wheels from the power plant and means for steering the rear wheels, a transverse shaft carried by the chassis, means for driving the same from the power plant, a pair of forwardly extending shafts at the sides of the chassis, means for rotating the same from the transverse shaft, one forwardly extending shaft being shorter than the other, a crank disk on the front end of each forwardly extending shaft, a frame supported on the forward part of the chassis, housings enclosing the forwardly extending shafts, and supported from the frame, a pair of substantial L-shaped bars supported from the frame for vertical swinging movement, one bar being arranged adjacent one forward corner of the frame and the other adjacent the other forward corner of the frame and one bar being supported forwardly of the other bar, a bracket pivotally supported by each bar at a point adjacent the junction of one arm of each bar with the other arm, a cutter assembly having one end pivotally connected to each bracket, said assemblies extending in the same direction, pitmans connecting the knives of the cutter assemblies with the crank disks, manually operated means connected with the brackets for adjusting the cutting assemblies relative to the ground and means for swinging the assemblies on their pivots.

J. AMBROSE BROWN.